Aug. 13, 1935.	H. Y. SATTERLEE	2,011,202
APPARATUS FOR TOWING A SIGN
Filed May 31, 1934	2 Sheets-Sheet 1
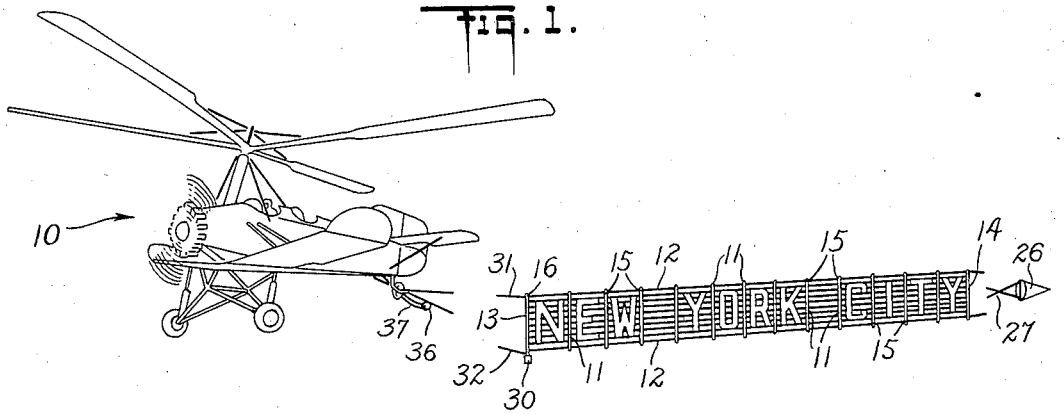
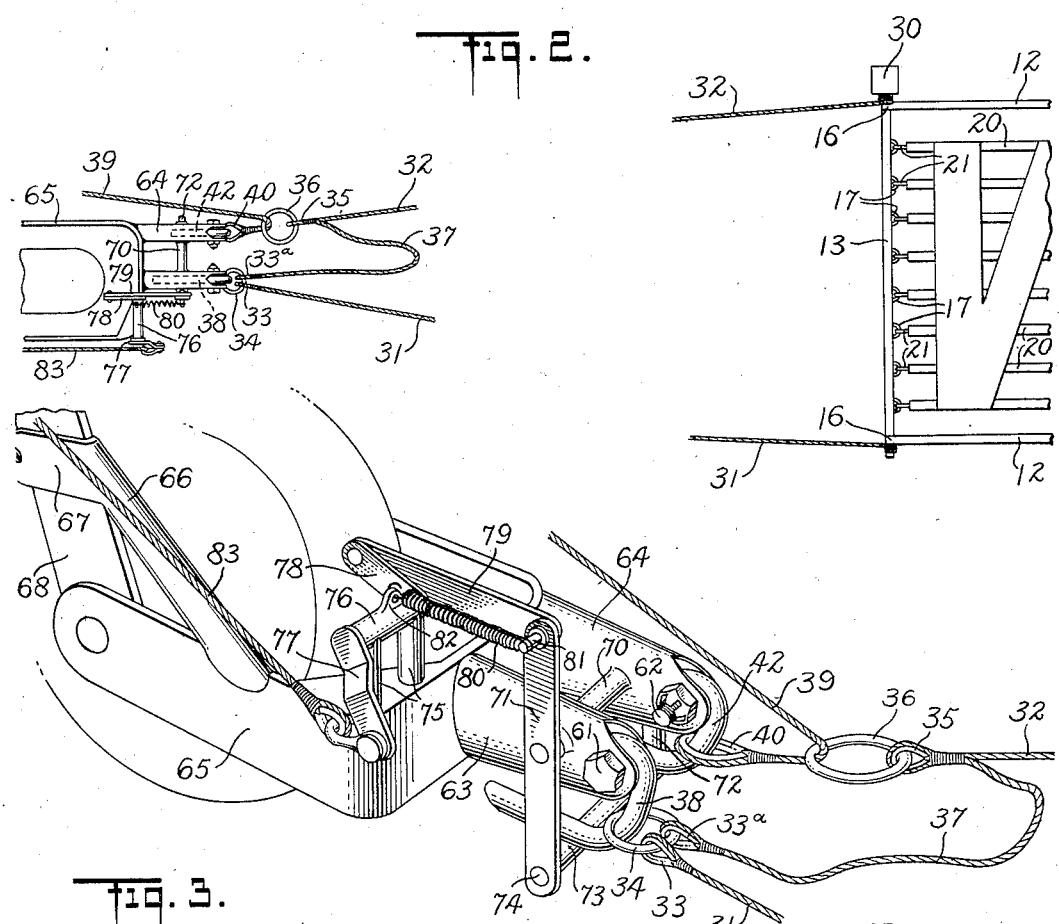
INVENTOR
Henry Y. Satterlee
BY
Blair, Curtis & Dunne
ATTORNEYS Aug. 13, 1935.    H. Y. SATTERLEE    2,011,202
APPARATUS FOR TOWING A SIGN
Filed May 31, 1934    2 Sheets-Sheet 2
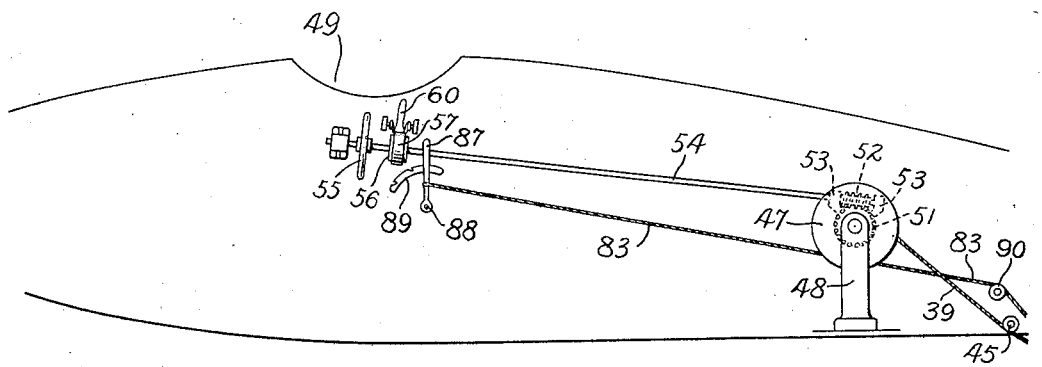
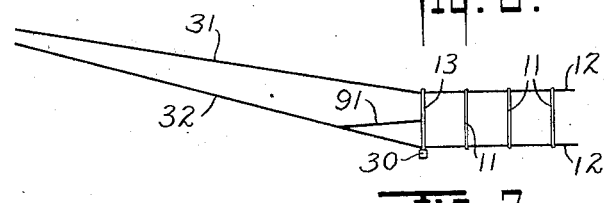
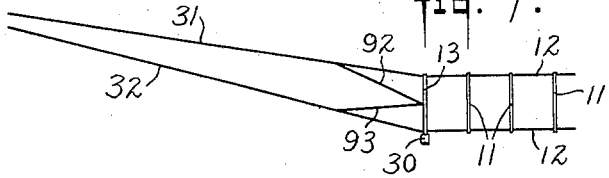
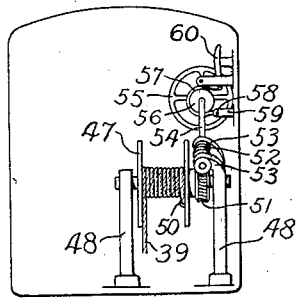
INVENTOR
*Henry Y. Satterlee*
BY
ATTORNEYS Patented Aug. 13, 1935

2,011,202

UNITED STATES PATENT OFFICE 2,011,202

APPARATUS FOR TOWING A SIGN

Henry Y. Satterlee, Woodmere, N. Y., assignor to Kellett Autogiro Corporation, Philadelphia, Pa., a corporation of Delaware Application May 31, 1934, Serial No. 728,373

3 Claims. (Cl. 40—127)

The invention relates to aerial signs and, with regard to its more specific features, to apparatus for towing a sign behind an aircraft.

One object of the invention is to provide sign towing apparatus adapted for use in different kinds of flying weather. Another object of the invention is to provide a sign and towing apparatus therefor which shall be extremely reliable in use. Another object of the invention is to provide a device of the class described permitting substantial economy of fuel in advertising flights. Another object of the invention is to provide apparatus for readily controlling an aerial sign from the towing aircraft. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of this invention, Figure 1 is a perspective view showing an autogyro towing an aerial sign in accordance with my invention;

Figure 2 is a plan view showing the tail wheel of an autogyro together with the leading edge of the sign in horizontal position, and the towing lines and the connections;

Figure 3 is a perspective view of the tail wheel of an autogyro with the control and releasing devices for the sign;

Figure 4 is a cross-sectional view of the autogyro looking forward and showing a controlling and rewinding device in elevation;

Figure 5 is a view of the interior of the fuselage of the autogyro, showing the controlling and rewinding device and certain controls in the pilot's cockpit.

Figures 6 and 7 are diagrammatic illustrations of modified towing connections.

Similar reference characters refer to similar parts throughout the several views of the drawings.

Referring first to Figure 1, I disclose an autogyro which is generally indicated by the numeral 10. Aerial signs may be effectively displayed by being towed by autogyros for the reason that an autogyro has a much lower stalling speed than an aeroplane and furthermore is capable of climbing at a steep inclination. The first of these stated qualities of an autogyro renders sign-towing thereby less hazardous than sign-towing by aeroplanes, while the second enables the sign to be launched with less liability of damage to the sign or crashing at the takeoff. A dirigible balloon has these characteristics to an even greater degree, but is known to be more expensive to operate. Therefore I prefer to use an autogyro for towing the sign according to the invention, but it should be understood that insomuch as signs generally can be and have been towed by aeroplanes and dirigible balloons, I am not limited to the use of my novel sign and apparatus in connection with an autogyro.

Referring now to Figures 1 and 2, the framework of the sign comprises a plurality of intermediate poles 11 joined at the top and bottom by tapes 12, together with a leading edge pole 13 and a trailing edge pole 14. The structure thus described constitutes an elongated rectangle divided into sections by the several poles. Preferably the poles 11 are bamboo poles, and preferably the leading edge pole 13 is made of tubular steel. In this manner the framework of the sign is of minimum weight consistent with adequate strength, as the intermediate poles 11 have less strain upon them than the leading edge pole 13. When a windsock, hereinafter mentioned, is used, the trailing edge pole 14 is desirably also a tubular steel pole.

It will be understood that the several sections of the sign are articulated with respect to each other severally, and consistent with this other connecting structure may be employed, such as ordinary manila rope, or in some cases steel cables, but I prefer to use tape as indicated because of its lightness and its lack of tendency to kink or coil. I prefer to utilize continuous strands for the elements 12 so as to minimize the chances of the sign rupturing. The tapes or other flexible members 12 may be attached to the several poles 11 at the opposite ends thereof by gummed adhesive tape, such as the ordinary black commercial type which passes under the designation of "electric tape". In fastening the tapes 12 to the poles 11, "electric tape" 15 is wound around the poles and stuck thereto and crossed back and forth over the tape 12. At the leading edge and trailing edge poles tape 12 is preferably passed completely around the poles and sewed to itself, to form a loop, then reinforced with "electric tape" 16, as it is at these points that the greatest tension exists between tape 12 and poles.

Referring now to Figure 2, I provide a great number of D-shaped rings 17 and affix them to the poles 11, 13 and 14 with "electric tape". Each of the poles 11 has a pair of rings one on each side while poles 13 and 14 have but a single set, and the rings are located in equally spaced parallel horizontal lines.

I provide letters such as illustrated cut out of cloth and to these I sew tapes 20 in parallel lines spaced equidistant from each other, all tapes 20 being of the same length and being of a length, together with snap hooks 21 located on each end thereof, to extend between opposite rings in a section between successive poles 11 or between a pole 11 and the pole 13 or between a pole 11 and the pole 14. All of the sections in the sign preferably are of the same width so that a given letter structure, which is detachable, can be fitted into any section.

A windsock 26 in the form of a cone may be attached to the trailing edge pole 14 by a plurality of cords 27, and the geometrical arrangement of the cords and windsocks may be as shown, but other arrangements are possible, it being desirable to have the drag centered on the pole 14. The pole 13 and if desired also the pole 14 may have weights 30 on the bottom end.

Referring now to Figures 1 and 2, a rope or cable 31 is attached at one end to the top of the leading edge pole 13 nearly in line with the tape 12. Any suitable means may be employed for the attachment of the rope or cable 31, such as splicing, with or without a thimble. A rope or cable 32 is attached to the leading edge pole 13 near the bottom thereof or nearly in line with the bottom tape 12. Referring now to Figures 2 and 3, the rope or cable 31 is fastened to a thimble 33 and thus to a ring 34, the thimble being on the ring. Likewise the rope or cable 32 is fastened to a thimble 35 and thus to a ring 36, the thimble being on the ring. Connecting the thimble 35 with the ring 34 is a rope or cable 37, which is secured to a thimble 33a also on the ring 34. The ring 34 is a towing ring and is held by a release hook 38, but the ring 36 is held by a rope 39 one end of which is attached, as by means of a thimble 40, to a second release hook 42. The other end of the rope 39 is adjustably attached to the tail of the autogyro and the release hooks are pivotally mounted on the autogyro, both of these features being more fully described hereinafter. By using two ropes or cables, 31 and 32, with the continuation 37 of 32, I lessen the chances of the sign dropping on account of breakage of a thimble, but variations in the manner of connecting the ropes or cables to the rings may be adopted.

In order to make a flight with the aerial sign, the sign is laid out on a flying field in an up and down wind direction, with the letters readable, and with the trailing pole 14 to windward and the leading edge pole 13 to leeward. The autogyro 10 is to leeward of the sign, the ropes 31 and 32 being about the length of the sign, and the autogyro may take off in the usual manner, whereupon, the ropes or cables being connected as described to the release hooks 38 and 42, the sign is picked up as soon as the tow ropes 31 and 32 are straightened out, the sign being taken off section by section, and being turned over. When the sign is in the air it assumes the position shown in Figure 2 which, it will be remembered, is a view looking down from the top. The various poles are horizontal and the letters are now not readable from the top; on the contrary they are readable from the bottom.

The horizontal position of the sign may be assured by forming an equilateral triangle with the ropes 31 and 32 and the pole 13, assuming the weight 30 is not used or, when using the weight 30, by slightly shortening the side including the rope 32. The takeoff is quicker and less dangerous with my sign arranged and connected as described than in a case of signs which immediately assume a vertical position, as the sign has some lift immediately it is launched. Furthermore, what I call taxi flying, that is flying to the locus of operations for an advertising display or the like, may be accomplished much more economically with the sign towed in a horizontal position as described. That is to say, the lift drag coefficient being more favorable, less fuel will be used, and the autogyro can be flown at a higher speed, and at the same time load on the "stick" is lessened, and a further factor in producing easier flying conditions resides in the attachment of the sign to the tail of the autogyro rather than to the under carriage. Although I have described the takeoff of the sign section by section with accompanying inversion thereof, under favorable conditions, such as a good wind, or grass on the flying field, I may take it off as a unit, in which case it is laid out on the field with the letters not readable and with the leading edge pole to windward. My invention permits this kind of a takeoff because the sign has lift the instant it is raised, owing to the fact that the poles are maintained horizontal, and this characteristic of my sign and towing connections also permits me to use shorter towing connections than have heretofore been practical.

Advertising flights should be undertaken with the sign in substantially a vertical position because it is more readable in that position. I provide means to cause the sign to assume a vertical position at will. Referring now to Figure 5, the rope 39 extends upwardly into the tail part of the fuselage 44, being guided by suitable pulleys 45 to a winding drum 47. As shown in Figure 4, the winding drum 47 is journaled on suitable supports or standards 48, which may be located at any convenient place in the fuselage. One end of the rope 39 is affixed to the winding drum 47 as at 50, and by rotating the drum that side of the towing triangle which includes the rope or cable 32 can be shortened and lengthened within limits.

Affixed to one end of the winding drum 47 is a worm wheel 51 and with this worm wheel meshes a worm 52, which is journaled in bearings 53 provided by one of the supports 48. Referring now to Figure 5, attached to the worm 52 is a shaft 54 which extends into the cockpit 49 and upon the end of which in the cockpit is a hand wheel 55. A brake drum 56 is likewise fastened to the shaft 54 and a brake band 57 extends around the drum 56 being affixed at 58 to a bracket 59 which is secured to the fuselage, and the brake band being connected at the other end to a toggle lever 60 by means of which the brake may be applied or released. When it is desired to cause the sign to assume a vertical position, the brake band 57 is released by the pilot and the pilot then rotates the hand wheel 55 in the direction to pay out the rope 39, whereupon that side of the triangle which includes the rope 32 in the towing connection is lengthened, and the weight 30 or, in the absence thereof, the corresponding end of the pole 13 is lowered. It will be seen that the pilot has complete control over the towing connections, and may accurately adjust the shape of the towing triangle in accordance with the then existing conditions as distinguished from theory, and may thus cause the sign to tow vertically, and likewise when it is desired to tow the sign with the poles horizontal, by adjusting that side of the towing triangle which includes the rope 32 the sign may be adjusted until the various poles are in a horizontal plane, thus giving it the maximum possible lift.

The mechanism for adjusting the sides of the towing triangle is advantageous further in that the poles may be caused to assume any desired angle between the vertical and the horizontal. The sign is best readable when its plane is perpendicular to the line of sight between it and the locus to which the advertising is being directed, and such perpendicular plane may assume various angles under different conditions.

When the advertising flight has been completed the sign may be caused to reassume a horizontal position by operation of the hand wheel 55. The purpose of the brake 56, 57 is to prevent gradual turning of the drum 47 by reason of the pull on the rope 39, for while a worm may not easily be turned by a worm wheel, it is preferable to have a locking device to prevent gradual slippage.

The invention further provides means for dropping the sign, as it is desirable to drop a sign before landing an autogyro. Referring now to Figure 3, the release hooks 38 and 42 are respectively pivoted at 61 and 62 to rearwardly extending parallel brackets 63 and 64 which may be welded to a generally U-shaped bracket 65. The bracket 65 is mounted on the axle of the tail wheel of the autogyro and has upwardly extending arms 66 which are connected by clamps 67 to the tail wheel supporting fork 68, this fork 68 being swiveled to the tail end of the autogyro.

Extending between and through the brackets 63 and 64 is a tube 70, and extending through the tube 70 and fastened at its left hand end to a lever 71 is a rod 72 which is U-shaped, one leg of U being indicated at 73 and constituting a locking bar for the hooks 38 and 42, the free end 74 of the locking bar 73 being secured to the lever 71. Thus the lever 71 and rod 72 including the locking bar 73 forms a closed rectangle, with one end of the lever 71 projecting upwardly therebeyond.

A pair of standards 75 support a tube 76 in which is a rod, not shown, the ends of which are affixed to arms 77 and 78. The arm 78 is connected by a link 79 to the top of the lever 71, while a spring 80 connects the pivot pin 81 joining the link 79 and lever 71 to a lug 82 on the tube 76.

To the outer end of the arm 77 is connected a steel cable 83 which extends toward the swiveling point of the fork 68 and thence into the fuselage of the autogyro and, as shown in Figure 5, forwardly to the cockpit 49 where it is connected to a hand lever 87 pivoted at 88 and rubbing against a notched segment 89. Suitable pulleys 90 guide the cable 83 from the arm 77 to the lever 87.

When the pilot desires to drop the sign, he pushes the lever 87 forward which moves the locking bar 73 forward thus releasing the hooks 38 and 42. The hook 42, as shown in Figure 2, is shorter than the hook 38, so the hook 42 is released first and thus the rope or cable 31 is released last which prevents the sign from turning over. In this connection there are several different conditions of use and operation of the invention which may be pointed out. If the sign is horizontal when it is released, the sequence of the releasing action insures a tendency to so drop the sign that the weight 30 will strike the ground first, which offers less chance for breakage. If the sign is already vertical the sequence of the releasing operation prevents it from turning over. It is desirable to have the sign land with the least possible entanglement of its various parts.

In the releasing operation, when the thimble 40 is released from the hook 42 it runs through the ring 36 which is larger. There is a slight lag due to this thimble-through-ring release which is compensated for by releasing the hook 42 first, and the operator may extend the time between successive releasing actions as experience dictates, by moving the lever 87 slowly. The sequential releasing arrangement has a further ad- advantage in that the winding and adjusting mechanism may be omitted and the ring 36 placed upon the release hook 42. In such a case the sign takes off in a horizontal position, as described, and when it is desired to cause the sign to assume a vertical position, the pilot moves the lever 87 forwardly to a notch which indicates that the hook 42 has been released, but not far enough to release the hook 38. The sign then assumes a vertical position, the rope or cable 37 increasing the length of one side of the towing triangle to place the sign in vertical position. For short flights where it is deemed not of such great importance to cause the sign to reassume the horizontal position for taxiing back to the landing field, this manner and method of connecting up the elements of the invention may be adopted and, by reason of its simplicity, presents practical advantages. In such a case, when it is desired to drop the sign, the remaining release hook 38 is released, by moving the lever 87 forward to its extreme position.

I have shown in Figures 6 and 7, diagrammatically, modifications of the invention involving modified towing means. Considering now Figure 6, the bottom towing line 32 has a bracing line 91 which makes possible the use of a lighter leading edge pole 13. In Figure 7 I have shown a bracing line 92 leading from the upper line 31 to the leading edge pole 13 together with a bracing line 93 leading from the lower line 32 to the leading edge pole to distribute the pull of the pole 13 to four places.

It will thus be seen that the invention provides apparatus whereby the sign may be caused to assume different positions at will, and may be released under any conditions practically instantaneously. It will thus be seen that there has been provided by this invention an apparatus in which the various objects hereinbefore set forth, together with many thoroughly practical advantages, are successfully achieved. As many possible embodiments may be made of the above invention, and as many changes may be made in the embodiment above set forth, it is to be understood that all matter hereinbefore set forth or shown in the accompanying drawings is to be interpreted as illustrative and not in a limiting sense.

I claim:—

1. Aerial apparatus for use in connection with an aircraft comprising a pair of release hooks attached to the aircraft, manual control means for releasing one of said hooks at will and for thereafter releasing the other of said hooks, an elongated rectangular sign, a leading edge pole at the front of said sign, a line extending from one end of said leading edge pole to one of said hooks, a line extending from the other end of said pole to the other of said hooks, rings attached to the end of said lines and locked on said hooks, the lines being approximately equal in length, and a connecting line connecting said rings, whereby upon release of one of said hooks said sign turns from a horizontal to a vertical position and upon the release of the other hook the sign drops.

2. Aerial apparatus for use in connection with an aircraft comprising a pair of release hooks attached to the aircraft, manual control means for releasing first one of said hooks and thereafter the other thereof, a ring on the first specified hook, a line attached to said ring and extending into the aircraft, a winding drum for said line in the aircraft, a second ring larger than the first named ring held in position by said line, a ring on the other release hook, and lines from the last mentioned ring and from the large ring extending to the sign, whereby the inclination of the sign around the axis of the line of flight may be controlled and the sign may be dropped at will.

3. Apparatus for towing of signs behind aircraft comprising a pair of parallel coaxial hooks, a releasing bar below said hooks and holding them from dropping, one hook being longer than the other, and levers and connections to move said releasing bar from the aircraft to drop first one hook and then the other at the will of the pilot.

HENRY Y. SATTERLEE.